(12) United States Patent
Warden et al.

(10) Patent No.: US 7,434,931 B2
(45) Date of Patent: Oct. 14, 2008

(54) CUSTOM EYEGLASS MANUFACTURING METHOD

(75) Inventors: Laurence Warden, Poway, CA (US); Andreas W. Dreher, Escondido, CA (US); Tro Murphey, San Diego, CA (US)

(73) Assignee: Ophthonix, Vista, CA (US)

( * ) Notice: Subject to any disclaimer, the term of this patent is extended or adjusted under 35 U.S.C. 154(b) by 736 days.

(21) Appl. No.: 10/756,243

(22) Filed: Jan. 13, 2004

(65) Prior Publication Data

US 2004/0189935 A1 Sep. 30, 2004

Related U.S. Application Data

(63) Continuation-in-part of application No. 10/046,656, filed on Oct. 25, 2001, now Pat. No. 6,682,195.

(51) Int. Cl.
*A61B 3/10* (2006.01)
(52) U.S. Cl. ...................................... 351/204
(58) Field of Classification Search ................ 351/204, 351/227, 228, 246, 247, 231–233
See application file for complete search history.

(56) References Cited

U.S. PATENT DOCUMENTS

| | | | |
|---|---|---|---|
| 3,933,411 A | 1/1976 | Winner |
| 3,973,837 A | 8/1976 | Page |
| 4,268,133 A | 5/1981 | Fischer et al. |
| 4,653,881 A | 3/1987 | Joncour et al. |
| 4,666,236 A | 5/1987 | Mikami et al. |
| 4,869,587 A | 9/1989 | Breger |
| 4,874,234 A | 10/1989 | Wichterle |
| 4,996,123 A | 2/1991 | Nomura et al. |
| 5,100,589 A | 3/1992 | Ticknor |
| 5,114,628 A | 5/1992 | Hofer et al. |
| 5,116,684 A | 5/1992 | Fretz, Jr. et al. |
| 5,198,844 A | 3/1993 | Roffman et al. |
| 5,266,352 A | 11/1993 | Filas et al. |
| 5,343,260 A | 8/1994 | Henry et al. |
| 5,372,755 A | 12/1994 | Stoerr et al. |
| 5,406,340 A | 4/1995 | Hoff |
| 5,433,810 A | 7/1995 | Abrams |
| 5,448,312 A | 9/1995 | Roffman et al. |
| 5,528,321 A | 6/1996 | Blum et al. |

(Continued)

FOREIGN PATENT DOCUMENTS

DE 197 52 729 A1 6/1999

(Continued)

OTHER PUBLICATIONS

Moretti, Michael, "New laser-based technologies incubate," Opthamology News, Nov. 29, 2001.

(Continued)

*Primary Examiner*—George Manuel
(74) *Attorney, Agent, or Firm*—Morrison & Foerster LLP

(57) ABSTRACT

Two or more images captured from digital cameras record an image of spectacle frames on a subject. The image is analyzed using automated image-processing techniques to identify the relation of specific points of interest on the frame to the location of each of the subject's eyes allowing the optical center of the lens to be placed in the correct location in the frames.

14 Claims, 10 Drawing Sheets

U.S. PATENT DOCUMENTS

| | | | |
|---|---|---|---|
| 5,585,968 A | 12/1996 | Guhman et al. | |
| 5,592,248 A | 1/1997 | Norton et al. | |
| 5,606,378 A | 2/1997 | Van Meurs | |
| 5,608,471 A | 3/1997 | Miller | |
| 5,617,154 A | 4/1997 | Hoffman | |
| 5,650,837 A | 7/1997 | Roffman et al. | |
| 5,715,031 A | 2/1998 | Roffman et al. | |
| 5,771,088 A | 6/1998 | Perrott | |
| 5,777,719 A | 7/1998 | Williams et al. | |
| 5,786,883 A | 7/1998 | Miller et al. | |
| 5,835,192 A | 11/1998 | Roffman et al. | |
| 5,861,934 A | 1/1999 | Blum et al. | |
| 5,864,379 A | 1/1999 | Dunn | |
| 5,872,613 A | 2/1999 | Blum et al. | |
| 5,880,809 A | 3/1999 | Lieberman et al. | |
| 5,929,969 A | 7/1999 | Roffman | |
| 5,949,521 A | 9/1999 | Williams et al. | |
| 5,953,098 A | 9/1999 | Lieberman et al. | |
| 5,956,183 A | 9/1999 | Epstein et al. | |
| 5,998,096 A | 12/1999 | Umemoto et al. | |
| 6,081,632 A | 6/2000 | Yoshimura et al. | |
| 6,089,711 A | 7/2000 | Blankenbecler et al. | |
| 6,109,749 A | 8/2000 | Bernstein | |
| 6,176,580 B1 | 1/2001 | Roffman et al. | |
| 6,240,226 B1 | 5/2001 | Presby et al. | |
| 6,274,288 B1 | 8/2001 | Kewitsch et al. | |
| 6,286,957 B1 * | 9/2001 | Livnat | 351/204 |
| 6,319,433 B1 | 11/2001 | Kohan | |
| 6,379,005 B1 | 4/2002 | Williams et al. | |
| 6,533,418 B1 | 3/2003 | Izumitani et al. | |
| 6,692,127 B2 * | 2/2004 | Abitbol et al. | 351/227 |
| 6,786,602 B2 | 9/2004 | Abitbol | |
| 2002/0196412 A1 | 12/2002 | Abitol | |
| 2003/0081173 A1 | 5/2003 | Dreher | |
| 2003/0086063 A1 | 5/2003 | Williams | |
| 2003/0123026 A1 | 7/2003 | Abitbol et al. | |

FOREIGN PATENT DOCUMENTS

| | | |
|---|---|---|
| DE | 100 07 705 A1 | 9/2001 |
| EP | 0 472 384 A2 | 8/1991 |
| EP | 0 949 529 A2 | 4/1999 |
| EP | 1 011 006 A1 | 6/2000 |
| EP | 1 136 869 A1 | 9/2001 |
| JP | 60-175009 | 9/1985 |
| WO | WO 98/53360 | 11/1998 |
| WO | WO 00/41650 | 7/2000 |
| WO | WO 01/02896 | 1/2001 |
| WO | WO 01/88654 A2 | 11/2001 |
| WO | WO 01/89424 A1 | 11/2001 |
| WO | WO 02/32297 A2 | 4/2002 |

OTHER PUBLICATIONS

Zeiss Eyeglass Fitting Product Description dated Jan. 22, 2004.
Zeiss Video Infral II System Product Description dated Jan. 22, 2004.
International Search Report for PCT/US2004/041977, mailed on Apr. 21, 2005, 4 pages.

* cited by examiner

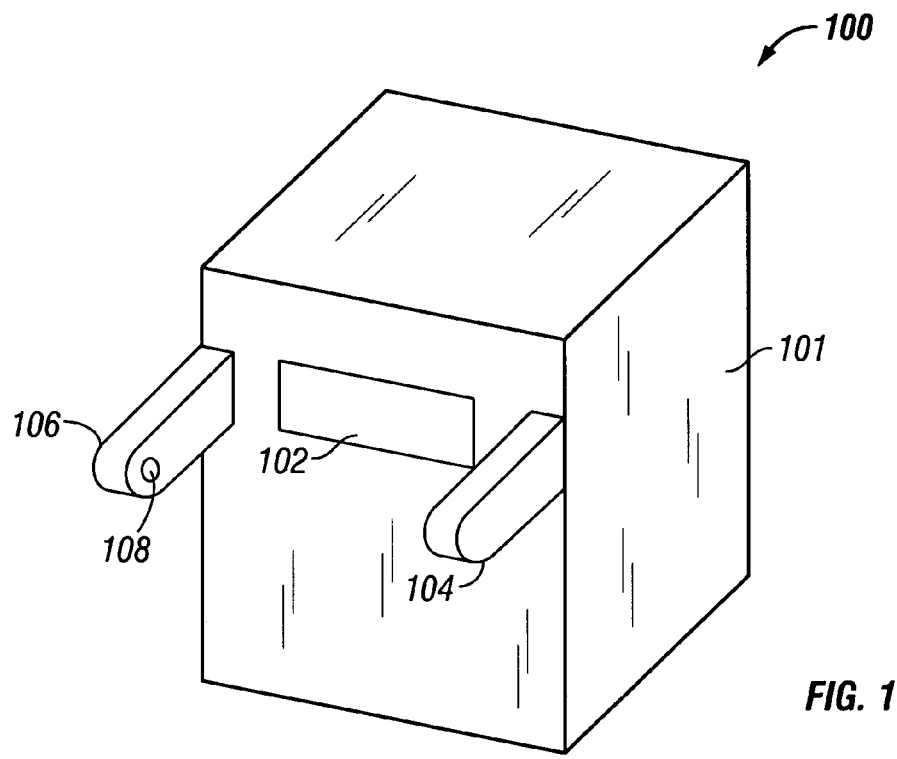
FIG. 1
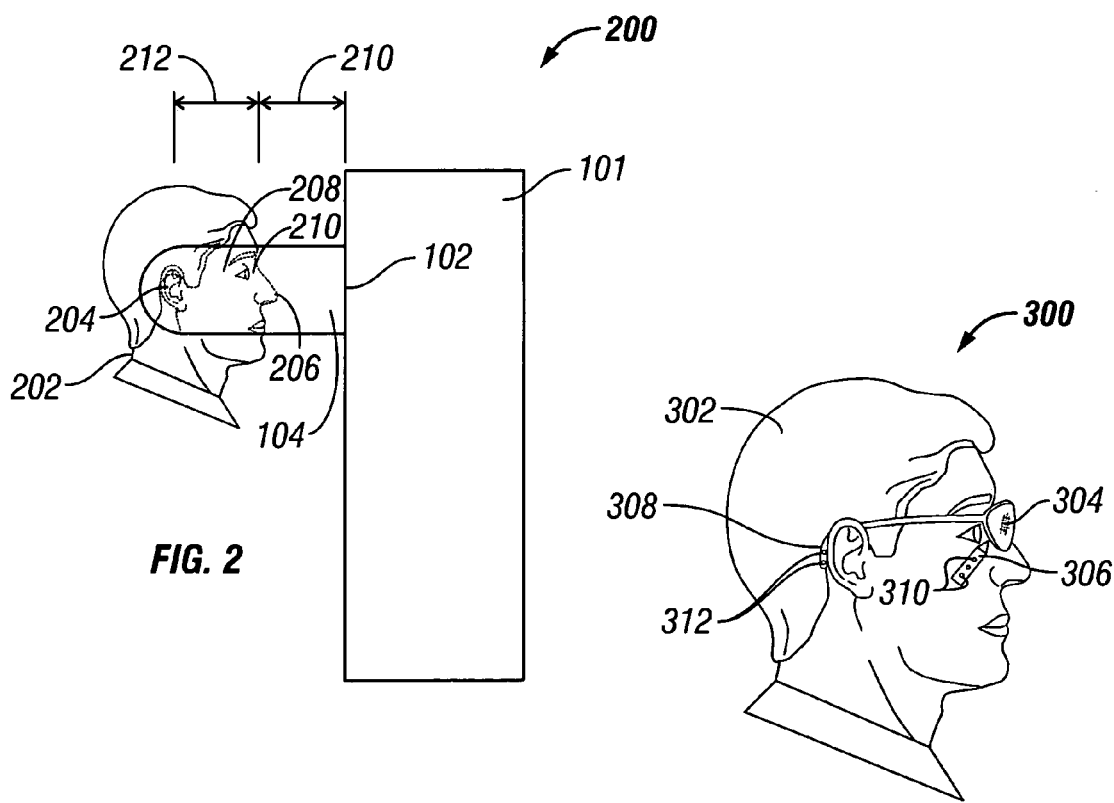
FIG. 2
FIG. 3

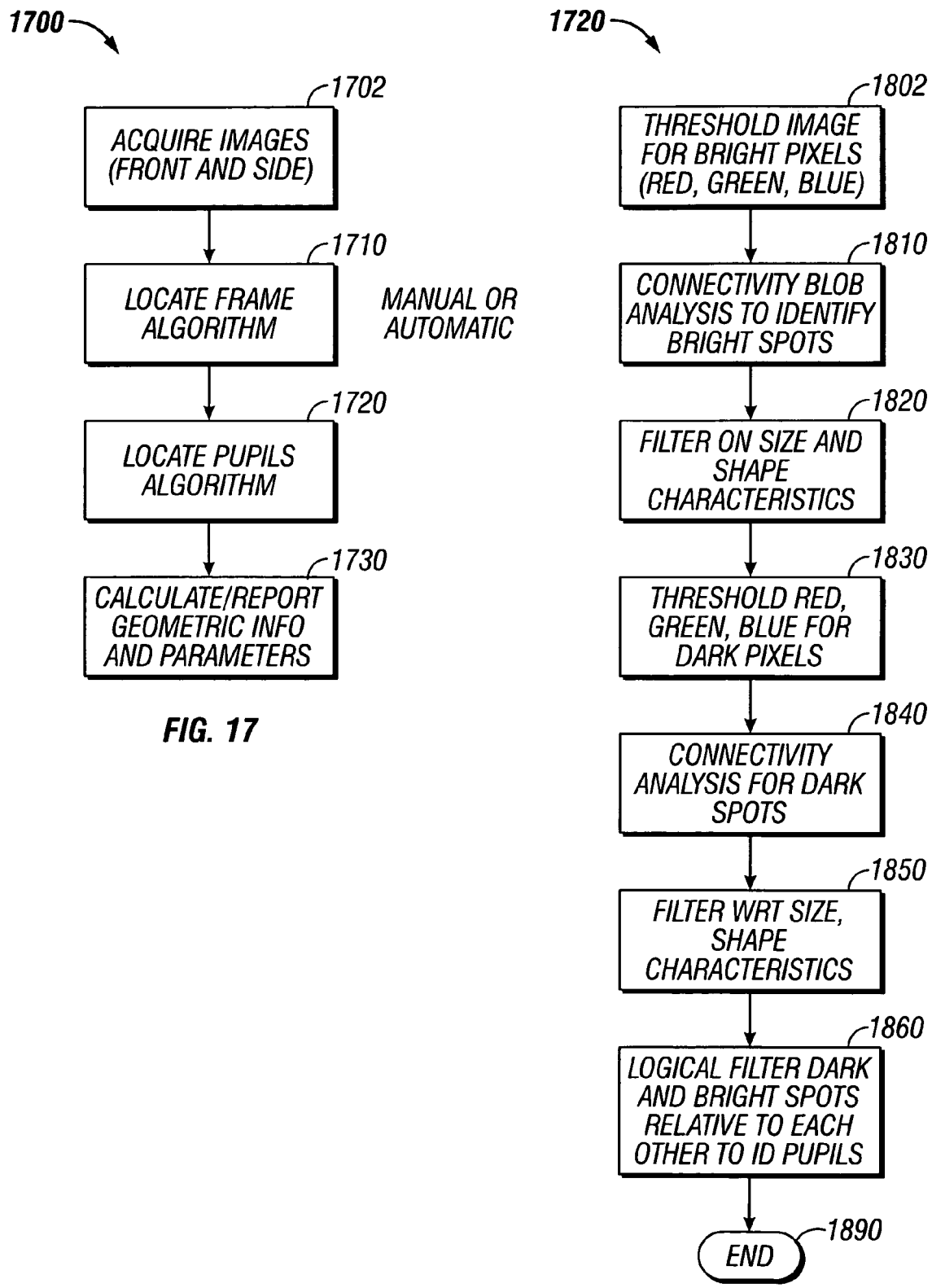

CUSTOM EYEGLASS MANUFACTURING METHOD

RELATED APPLICATIONS

This application claims the benefit of and is a continuation-in-part of U.S. application Ser. No. 10/046,656 entitled "CUSTOM EYEGLASS MANUFACTURING METHOD" filed Oct. 25, 2001, now U.S. Pat. No. 6,682,195 the entirety of which is incorporated herein.

BACKGROUND OF THE INVENTION

1. Field of the Invention

The present invention relates generally to an apparatus and method for fitting eyeglasses or spectacles. More specifically, the invention relates to an automated eyeglass frame and lens measurement and fitting system.

2. Description of the Related Art

Current eyeglass manufacturing technology does not provide lenses that precisely correct a patient's wavefront aberrations. However, new manufacturing techniques that make use of epoxies, cured to different indexes of refraction matching the wavefront aberrations of a patient, present new manufacturing challenges. Specifically, alignment of the spectacle with the patient's optical axis is of the utmost importance when making spectacle lenses that correct for aberrations other than spherical, cylindrical, and axis. In order to ensure such precise alignment, the distance of the lenses from the cornea's apex, the pupil distance, and the centering of the optic axes of the spectacle lens with respect to the patient's pupil (or visual axis) needs to be accurately measured.

Historically, eye care practitioners have utilized relatively simple methods to determine the positional location of a patient's eye in relation to the spectacle frame. A practitioner typically measures the distance between the pupils, referred to as pupilary distance, and the height from the center of the pupil to the bottom of the spectacle frame or lens. This second distance is referred to as the SEG height. This information is required by the lab to align the optical axis of the lens with the axis of each eye.

One technique utilized has been to simply use a grease pencil to mark the center of the pupil on the lens of the spectacle by "eye balling", and then using a ruler to measure the pupilary distance (PD) and SEG height. The accuracy of measuring PD has improved in recent years as pupilometers and digital pupilometers have become available. However, pupilometers do not relate PD measurements back to the position of the spectacle frame, nor do they measure other important parameters such as SEG height, vertex distance or pantoscopic tilt. With the advent of progressive addition lenses and the further development of higher order corrective zones, accurate measurement of all these parameters has become even more crucial.

U.S. Pat. No. 5,617,155, to Ducarouge, et al., teaches of a method of measuring the location of spectacle frames in relation to the subject eye using images. Specifically, the patent describes a technique of obtaining locations of the frame and eye automatically by analyzing the luminance gradient in the region of the pupils and the positions of the horizontal and vertical straight lines tangential to the frame. The technique utilizes only one camera and does not provide metrics from the side such as the vertex distance and tilt of the frames in relation to the line of sight.

U.S. Pat. No. 6,659,609, to Mothes, describes a single camera system placed at a distance of preferably 3 m. The device requires the use of a calibration target, which is clipped onto the spectacle frames to provide a spatial reference for determining the scale of the images. Also, as described in the patent, the subject does not look through the device but instead views him or herself in a mirror.

U.S. Pat. No. 5,592,248, to Norton, et al., describes taking several images at different angles to gain information for generating lenses for spectacles. In this patent, use of a single camera is claimed and moved to specific locations to gain the images necessary for 3D reconstruction. Multiple cameras are discussed in text but no description of how these images would be used in conjunction, or how to spatially orient the cameras to one another, therefore, the use of multiple cameras is not enabled in this patent. In addition, image analysis and fiducial landmarks are not utilized to automatically determine the location of the subject's pupil, but are simply measured with a interactive software ruler on the image.

U.S. application Publication No. 20030123026, to Abitbol, et al., describes a 3D camera system primarily intended for modeling and presenting digitally represented spectacle frames on a digitized representation of the subject. However, generating 3D reconstructions of a patient is time consuming and not necessary for generating the basic measurements required for spectacle lens fitting. In addition, the precision of commercially available 3D cameras is not sufficient for accurate placement of high-order corrective zones, which typically require placement of less than 0.5 mm.

SUMMARY OF THE INVENTION

A frame fitting system and method are disclosed. One or more image capture devices capture two or more images of spectacle frames on a subject. The image is analyzed using automated image-processing techniques to identify the relation of specific points of interest on the frame to the location of each of the subject's eyes allowing the optical center of the lens to be placed in the correct location in the frames. An image processor determines a pupilary distance and pupilary center from the images. A frame locator can receive a position of one or more lens frames or may determine the position of the one or more lens frames. The image processor can accurately determine the pupilary center and SEG height of corrective lenses that are to be fitted within desired spectacle frames.

BRIEF DESCRIPTION OF THE DRAWINGS

The novel features of this invention, as well as the invention itself, both as to its structure and its operation, will be best understood from the accompanying drawings, taken in conjunction with the accompanying description, in which like reference characters refer to similar parts, and in which:

FIG. 1 is a perspective view of a preferred embodiment of the wavefront measurement system;

FIG. 2 is a side view of the wavefront measurement system;

FIG. 3 is a side view of patient with test frame and moldings;

FIG. 17 is a flowchart of a method of fitting frames; and

FIG. 18 is a flowchart of a method of pupil location image processing.

DETAILED DESCRIPTION OF THE PREFERRED EMBODIMENT

Figure 4:
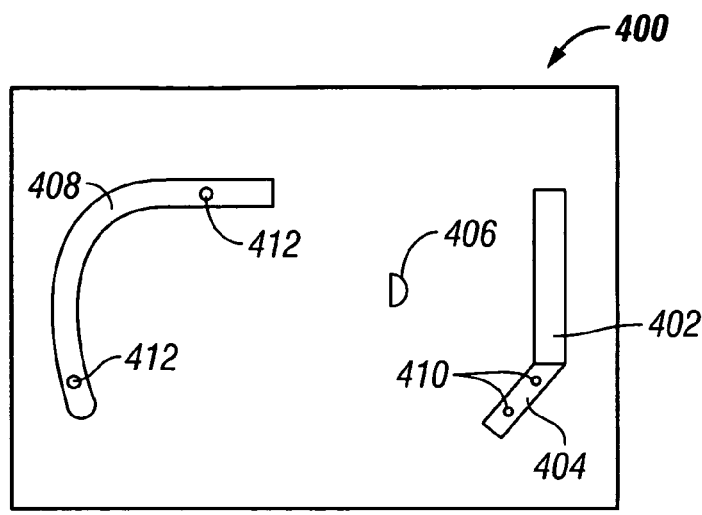
FIG. 4 is a right side view of patient with test frame and moldings.

Referring initially to FIG. 1, the wavefront measurement system is shown and generally designated 100. FIG. 1 shows that the wavefront measurement system 100 includes a main housing 101 in which a slot 102 allows for one or two cameras (not shown) to be placed in order to image the front of a patient (not shown), while allowing the patient to look at a virtual or real fixation target. Additionally, there may be a right housing 104 and a left housing 106, each extending from the main housing 101 and each having an opening 108 for a camera (not shown).

Referring now to FIG. 2, the wavefront measuring system of FIG. 1 is shown from a side view and is generally designated 200. FIG. 2 shows a patient 202 facing the wavefront measuring system main housing 101 and slot 102. A camera (not shown) mounted within right housing 104 photographs the side of patient's 202 head, including the patient's 202 ear 204 and nose 206. The camera or cameras mounted in slot 102 image the patient's 202 eyes 208, and specifically the pupil 210.

FIG. 3 shows a patient 302 wearing a eyeglasses frame 304 with known dimensions. The frame 304 is mounted to a nose molding 306, and an ear molding 308. Before both the nose molding 306 and the ear molding 308 have cured, registration markers 310 and 312 may be placed upon the nose molding 306 and ear molding 308 respectively. The patient 302 may then be imaged by the wavefront measuring system 100 while wearing the frame 304 such that the wavefront measuring system 100 may use either the test frame 304, the registration markers 310 and 312, or both in order to more accurately quantify the patient's 302 head and face for future eyeglass fittings.

FIG. 4 shows a right image of a patient and is generally designated 400. In FIG. 4, there is a right lens opening 402 attached to a right nose molding 404. The patient's right corneal apex 406 and right ear molding 408 can also be seen in the image. The registration marks 410 on the right nose molding 404 and the registration marks 412 on the right ear molding 408 aid the computer in determining the exact locations of the right nose molding 404 and the right ear molding 408 with respect to each other, and with respect to the patient's right corneal apex 406.

Figure 5:
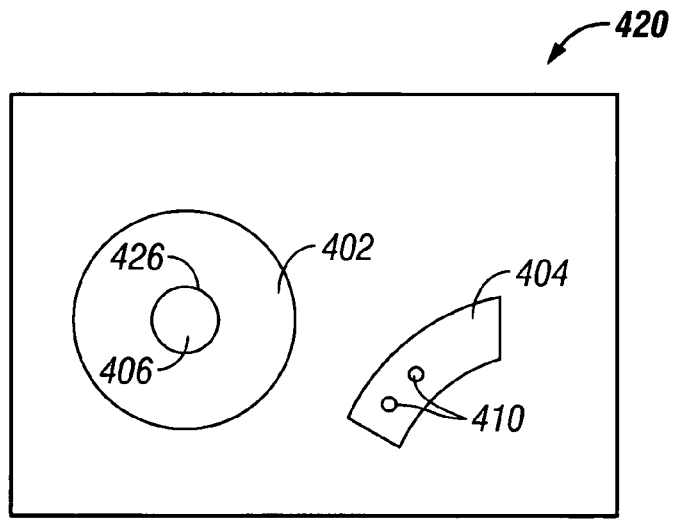
FIG. 5 is a right front side view of patient with test frame and moldings.

FIG. 5 shows a right front image of a patient and is generally designated 420. In FIG. 5, the patient's right pupil 426, the right lens opening 402, the right nose molding 404, and the registration marks 410, can be seen in the image.

Figure 6:
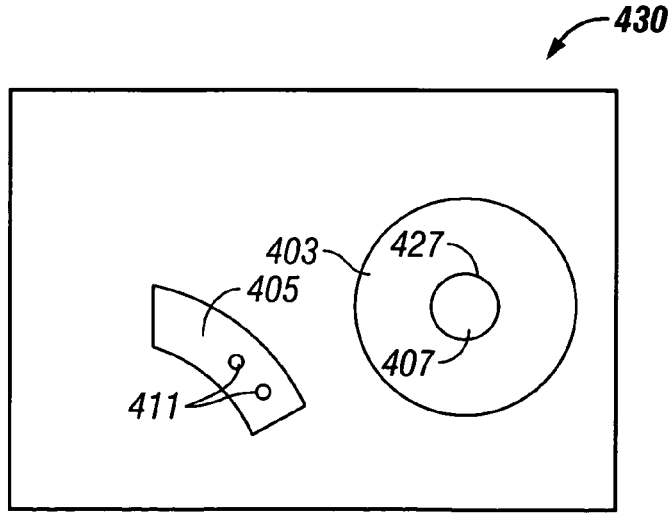
FIG. 6 is a left front side view of patient with test frame and moldings.

FIG. 6 shows a left front image of a patient and is generally designated 430. In FIG. 6, the patient's left pupil 427, the left lens opening 403, the left nose molding 405, and the registration marks 411, can be seen in the image.

Figure 7:
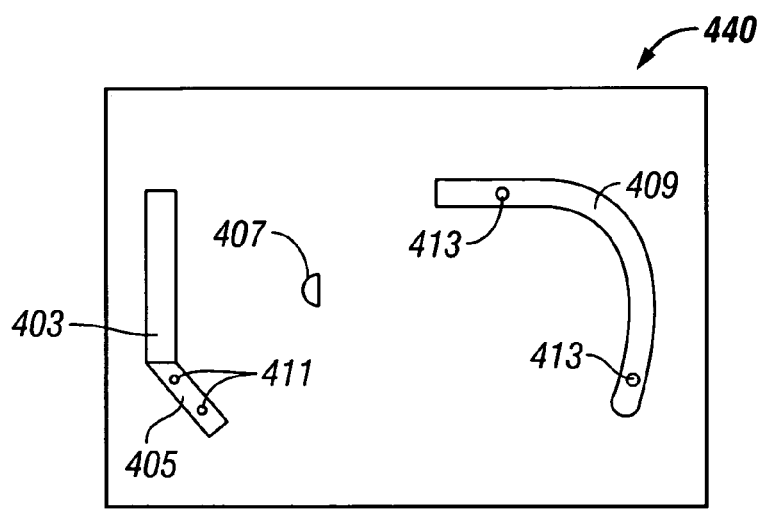
FIG. 7 is a left side view of patient with test frame and moldings.

FIG. 7 shows a left side image of a patient and is generally designated 440. In FIG. 7, there is a left lens opening 403 attached to a left nose molding 405. The patient's left pupil 427 and left ear molding 409 can also be seen in the image. The registration marks 411 on the left nose molding 405 and the registration marks 413 on the left ear molding 409 aid the computer in determining the exact locations of the left nose molding 405 and the left ear molding 409 with respect to each other, and with respect to the patient's left pupil 427.

After imaging the patient, the computer would have stored a right and a left side view, and two frontal views of the patient wearing the test frame 304, including the moldable nose pads 306 and moldable ear pads 308, while being examined with the wavefront measuring system. From the images, the exact location of the moldable nose pads 306 and the moldable ear pads 308 with respect to each other and with respect to the patient's pupils 426 and 427, corneal apexes 406 and 407, and the test frame 304 can be determined.

Figure 8:
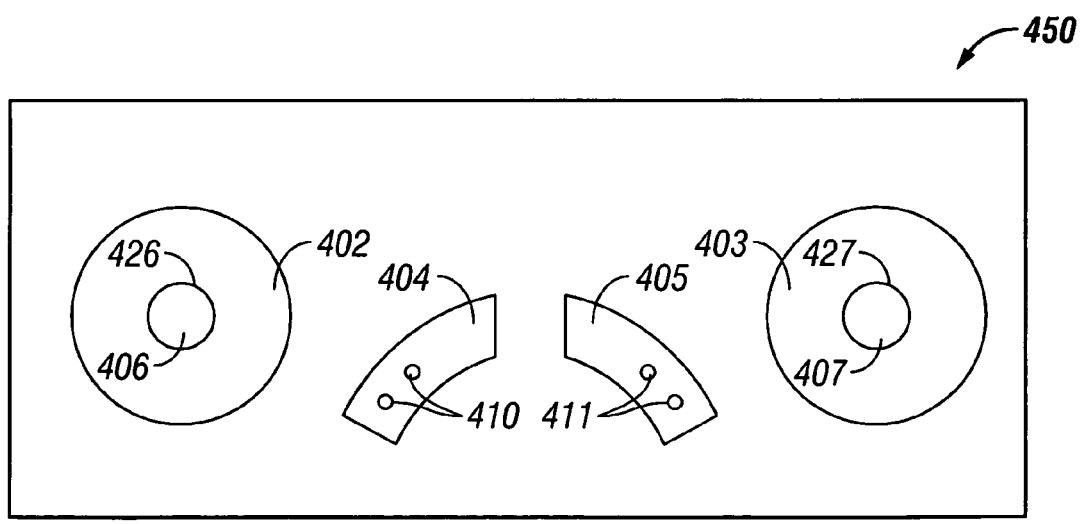
FIG. 8 is a front view of patient with test frame and moldings.

FIG. 8 shows a frontal image of a patient's face and is generally designated 450. In FIG. 8, only one camera is used to image the face and therefore the image contains both lens openings 402, 403, nose moldings 404, 405, and pupils 426 and 427.

Figure 9:
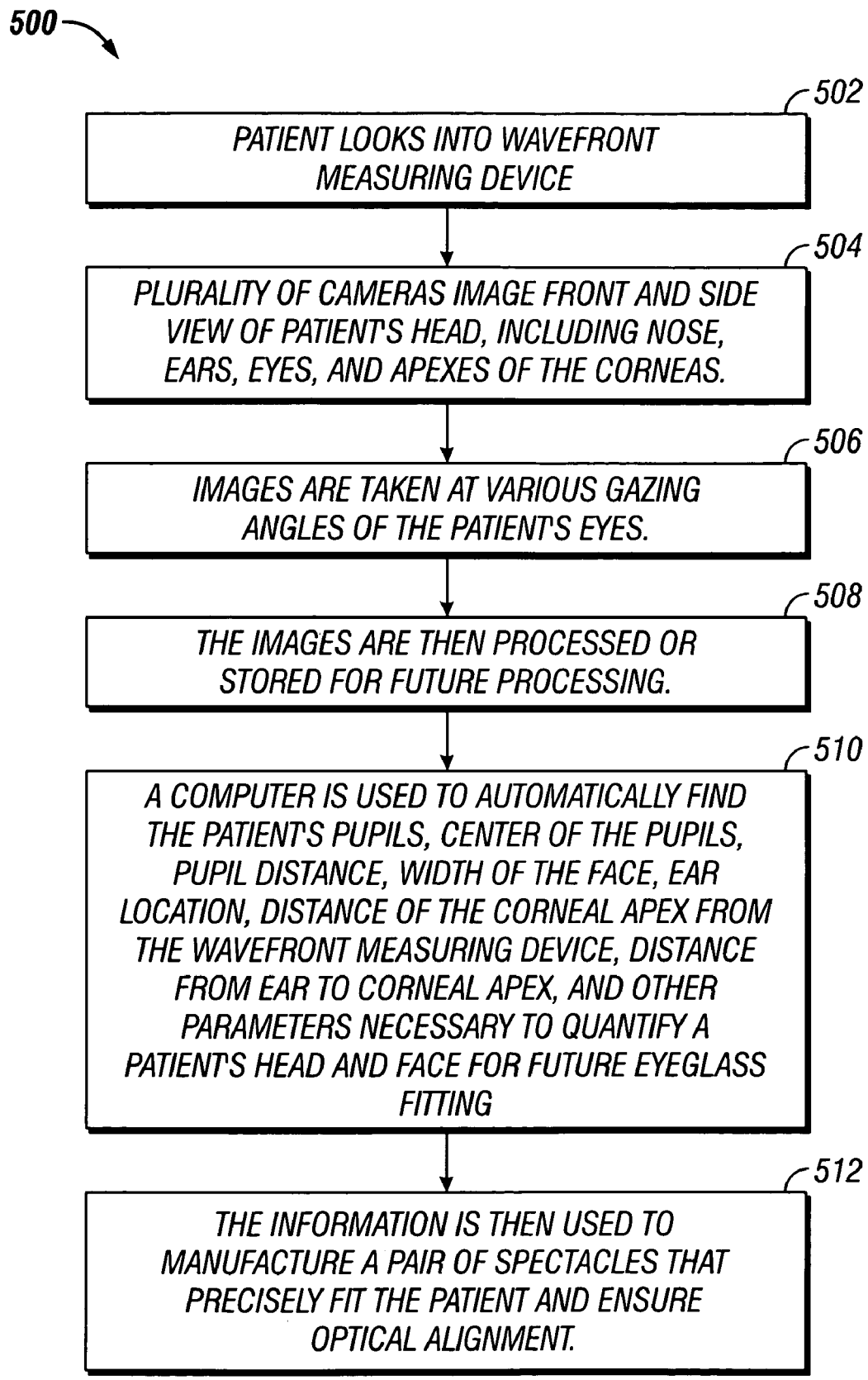
FIG. 9 is a flowchart illustrating a sequence of steps to manufacture custom eyeglasses.

FIG. 9 is a flowchart illustrating a sequence of steps to manufacture custom eyeglasses and is generally designated 500. In step 502, the patient looks into the wavefront measuring device in order to be imaged by the device. Once the patient is in a proper position, step 504 mandates that a plurality of cameras image the front and sides of the patient's face as can be seen in FIG. 2. Camera placement is only constrained by the need to image both the sides and front face of the patient, and therefore is not constricted to the configuration as depicted in FIG. 2. Step 506 indicates that it is necessary to take images at various gazing angles of the patient's eyes. Optical alignment for all gazing angles is a critical requirement when correcting for higher order aberrations. Therefore step 506 should be performed to ensure the custom eyeglasses function properly. Additionally, step 507 requires that wavefront measurements be taken for each of the images taken in step 506. In step 508, the computer processes the information and returns the output in step 510. The output consists of the locations of the patient's pupils, center of the pupils, pupil distance, width of face, ear location, distance of the corneal apex from the wavefront measuring device, distance from the ear to corneal apex, and other parameters necessary to measure a patient's head and face for eyeglass fittings. Using this information, collectively referred to as lens-mounting parameters, a pair of custom spectacles may be produced as indicated by step 512.

Figure 10:
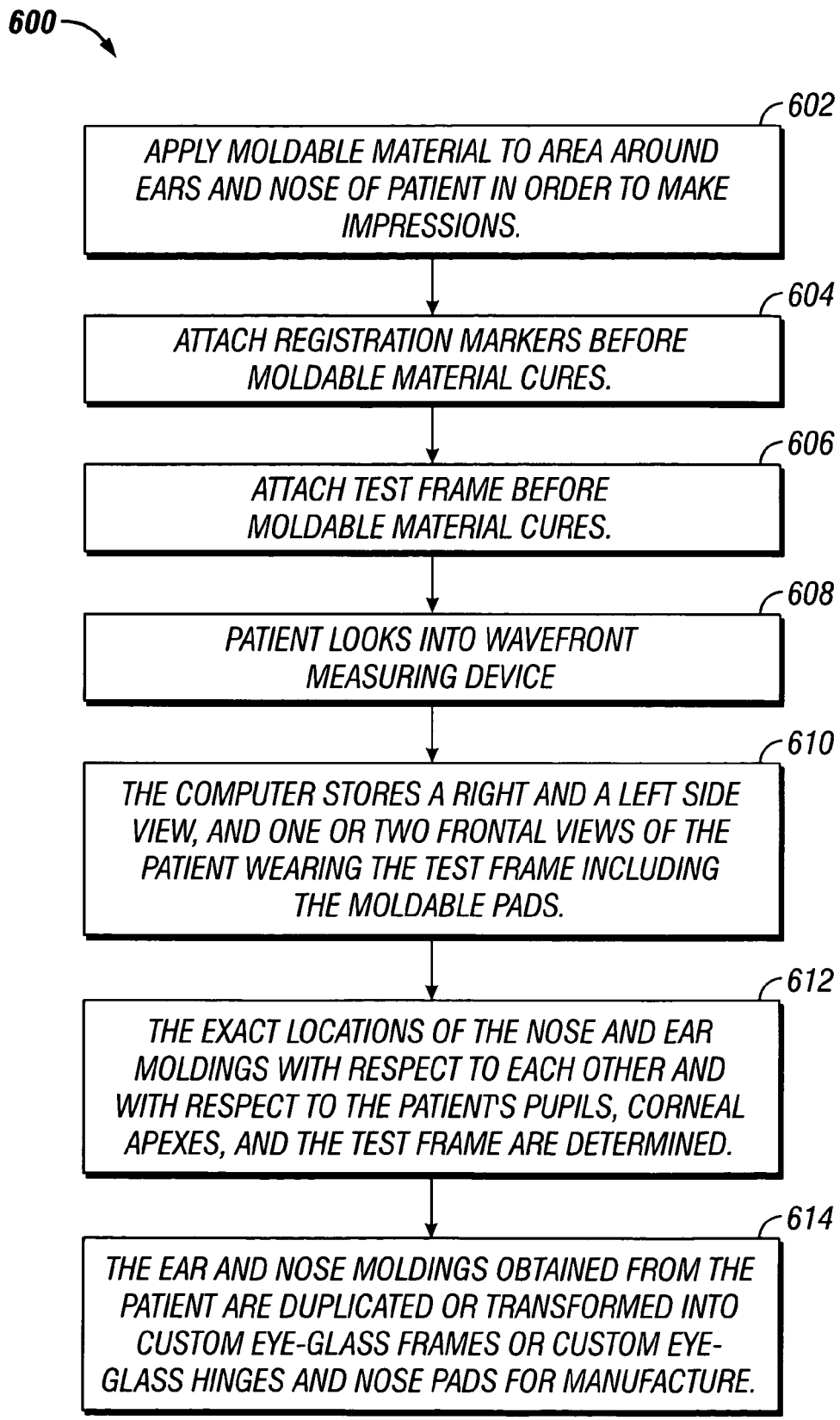
FIG. 10 is a flowchart illustrating an alternative sequence of steps to manufacture custom eyeglasses.

FIG. 10 is a flowchart illustrating an alternative sequence of steps to manufacture custom eyeglasses and is generally designated 600. In step 602, moldable material is applied around the nose and the area around the ears of the patient as can be seen in FIG. 3. The moldable material allows for a more conventional means of obtaining an accurate surface profile of the patient's nose and around the ears. In order to relate the moldings to wavefront measuring device, step 604 calls for registration markers are added before the moldings cure. The registration markers provide a means for the wavefront measuring device to gauge the molds with respect to the patient's face. Step 606 attaches a test frame of known dimensions to the moldable material before it cures. The registration markers of step 604 may or may not be affixed to the frame in step 606. The frame of step 606 and the molding of step 602 along with the registration markers of 604 can all be seen in FIG. 3. Step 608, similarly to step 502 of FIG. 9, calls for the patient to look into the wavefront measuring device. In step 610, the computer stores a right and a left side view, and one or two frontal views of the patient wearing the test frame including the moldable pads. The computer in step 612 returns the output of all the same parameters as indicated by step 510 of FIG. 9, but additionally includes the information with respect to the test frame and the moldings. Lastly, step 614 calls for the moldings to be duplicated or transformed into custom eyeglass hinges and nose pads for conventional frames.

In a preferred embodiment, the various moldings may be made of silicone. However, it is to be appreciated that any material capable of conforming to a person's head is suitable for use in the system.

Figure 11:
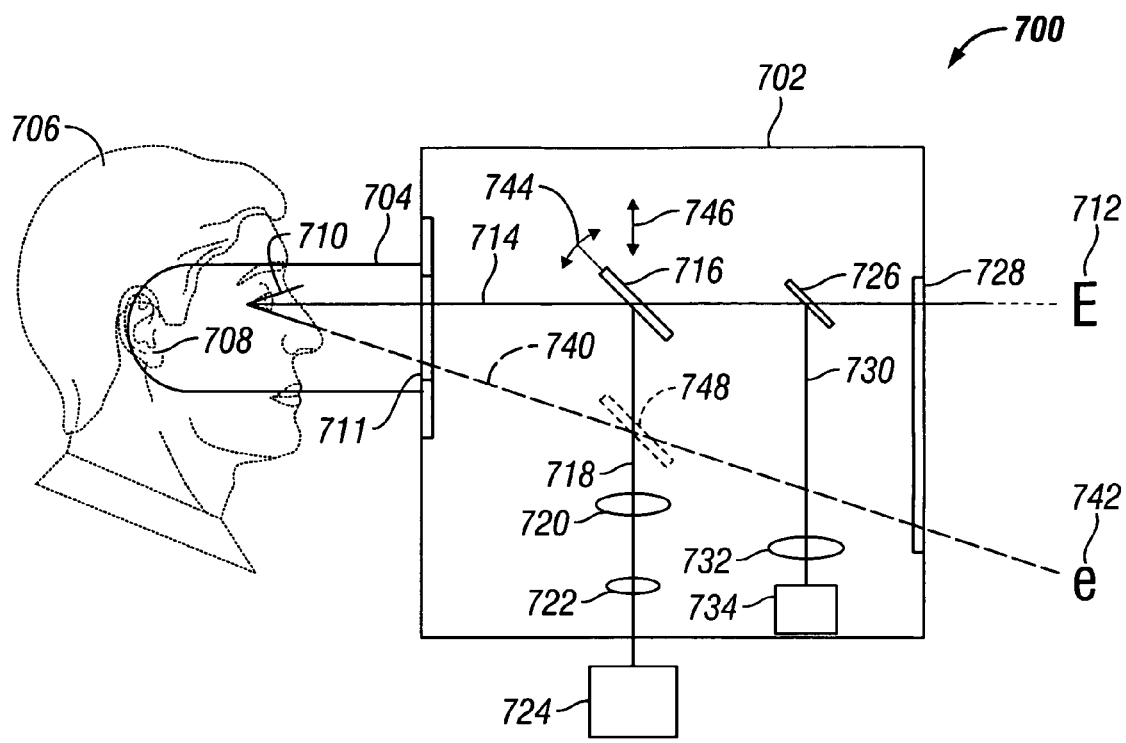
FIG. 11 is a side view of a wavefront measurement system showing the internal measurement devices within the system.

Referring now to FIG. 11, a preferred embodiment of the eyeglass measurement system is shown and generally designated 700. System 700 includes a main housing 702 having a right side housing 704 and a left side housing (not shown in this Figure) spaced apart to receive a person's head 706 such that his or her ears 708 are positioned between the side housings, and the patient's eyes 710 is positioned adjacent slot 711 on main housing 702.

As shown, the patient views a real fixation target 712 along an optical axis 714. Positioned along the optical axis 714 is a tiltable dichroic beam splitter 716 which splits a portion of the light passing from the patient's eye 710 to a secondary axis 718. The light passing along the secondary axis passes through a pair of imaging lenses 720 and 722 and onto a wavefront sensor 724, such as a Hartmann-Shack sensor.

In addition to the formation of secondary axis 718, an additional beam splitter 726 may be positioned along the optical axis to split a portion of light passing along the optical axis to a tertiary axis 730. The light passing along the tertiary axis passes through an imaging lens 732 and onto an imaging device, such as a charge coupled device (CCD) camera.

In order to provide an analysis of the eye for an eye when focussing at different focal lengths, a second, virtual target 742 may be provided along a second optical axis 740. In order for a portion of the light passing along the second optical axis to be received by the wavefront sensor 724, beam splitter 716 may be pivoted in angles 744, and may also be moved in directions 746 to properly position the splitter 716 on second optical axis 740 (as shown by dashed lines 748).

Using the eyeglass measuring system 700 facilitates the manufacturing of eyeglasses in accordance with method 600. By providing a single measurement system for measuring the optical correction needed for two distinct gazing angles, or optical axes, a corrective lens may be created which precisely matches the patients needs.

Figure 12:
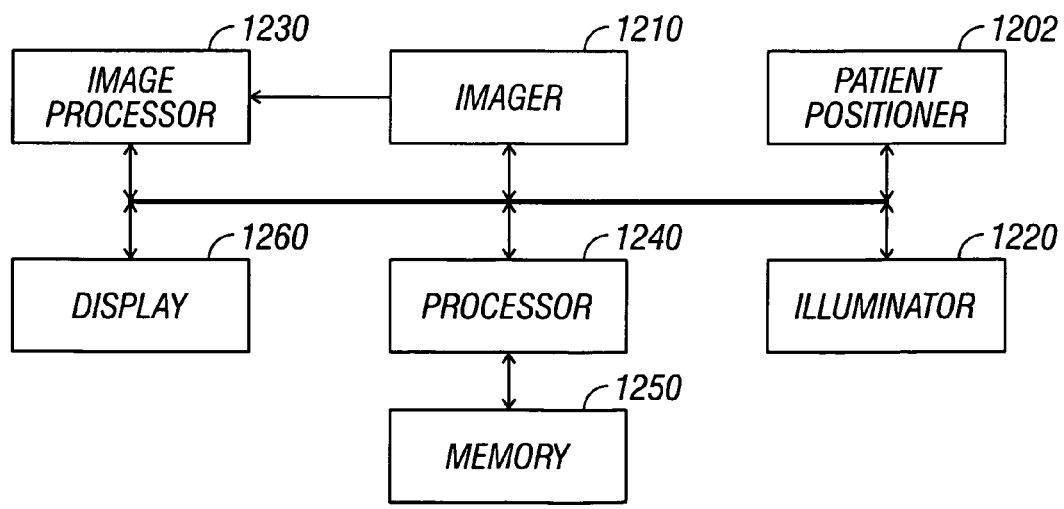
FIG. 12 is a functional block diagram of a frame fitter system.

Corrective lenses need to be properly fitted into a spectacle frame in order for a patient to optimally benefit from the correction provided by the lenses. FIG. 12 is a functional block diagram of an automated eyeglass frame fitting system 1200. The system 1200 accurately determines the pupilary distance (PD) and SEG height associated with a particular patient and a particular eyeglass frame. Such measurements can then be used, for example, to accurately position the corrective lenses within the eyeglass frame.

The system 1200 can be configured to capture one or more images of a patient wearing the desired eyeglass frames that are to be fitted with the corrective lenses. The captured images are processed to determine information to permit positioning lenses in the frame, for example, the pupilary distance and SEG height associated with the frames and the patient.

The system 1200 includes a patient positioner 1202 that is configured to approximately locate the position of the patient's head within a predetermined field of view. The positioner 1202 can be, for example, a chin rest, forehead rest, ear locator, nose bridge, and the like, or some other positioner or combination of positioners. The positioner 1202 need not be solely a mechanical positioner, but can also include an audio, optical, or some other type of electrical positioner.

An imager 1210 can be configured to capture one or more images of the patient's head, showing the relationship of the eyeglass frame to a portion of the patient's head. An illuminator 1220 can be configured to illuminate the patient's head, and can be configured to provide or create fiducial marks on the captured images. An image processor 1230 coupled to the imager 1210 analyzes the captured images. The image processor 1230 examines the captured images and is configured to determine the pupilary distance, SEG height, and pantoscopic tilt of the eyeglass frames, where the pantoscopic tilt refers to the angle of the frame from vertical. The distance of the lenses from the respective corneas, typically referred to as vertex distance, can also be determined.

The captured images as well as the resultant measurements can be output on a display 1260 or some other output device such as, for example, a printer or magnetic strip card writer. A processor 1240 in communication with memory 1250 can control some or all of the functions associated with the patient positioner 1202, imager 1210, illuminator 1220, image processor 1230, and display 1260. Additionally, some or all of the functions performed by the various functional blocks within the system 1200 can be stored as one or more processor readable instructions stored in memory 1250 and executed by the processor 1240. For example, in one embodiment, the image processing function can be stored as software in memory 1250 and performed by the processor 1240 executing the image processing software.

The imager 1210 can include one or more cameras or some other imaging apparatus. A camera can be a color camera or a monochrome camera. Additionally, one or more cameras can be configured with telecentric lenses. For example, the imager 1210 can include one or more cameras, CMOS cameras, charge coupled devices, photosensitive devices, and the like, or some other image capturing device. Similarly, the illuminator 1220 can include one or more light sources and can include one or more light filters. For example, one or more of the light sources can include incandescent light sources, fluorescent light sources, halogen light sources, xenon light sources, LED light sources, gas discharge light sources, radiant light sources, laser light sources, and the like, or some other light source. The illuminator 1220 can include white light sources, colored light sources, visible light sources, non-visible light sources, or a combination of light sources. Filters can include optical filters, gradient filters, polarizing filters, and the like, or some other type of filter. In one embodiment, the processor 1240 controls the duration and intensity of light from the illuminator 1220. In another embodiment, one or more illuminators can include one or more light sources. Light from some of the light sources may be filtered using optical filters to color the light emitted from the light source. The image processor may then be configured to identify features based in part on color detection.

Figure 13A:
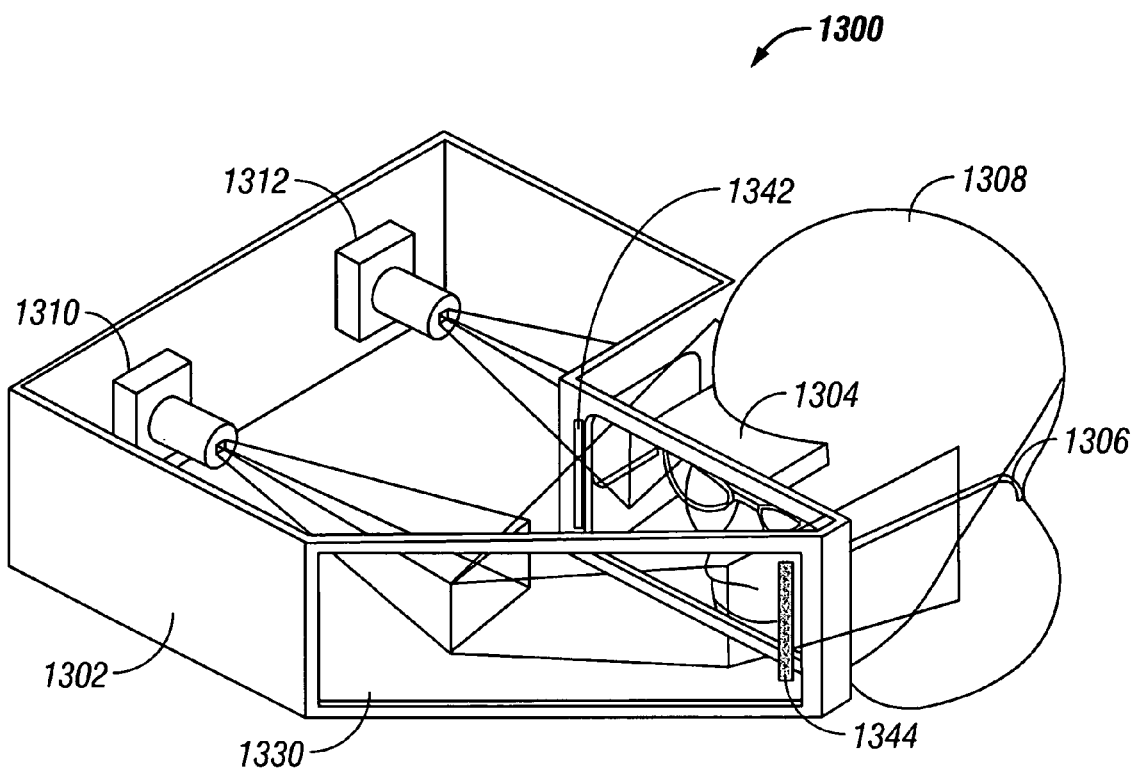
FIGS. 13A-13B are functional block diagrams of embodiments of frame fitter system.

FIG. 13A is an embodiment of the frame fitting system described in FIG. 12. FIG. 13A shows the relationship of the frame fitting system to a patient 1308 wearing spectacle frames 1306. The patient 1308 can be positioned relative to image capture equipment using a forehead support 1304.

The imager within the system utilizes two cameras 1310 and 1312 to capture images of the patient or subject 1308 wearing spectacle frames 1306. The cameras 1310 and 1312 can be, for example, CMOS cameras.

A first camera 1310 is positioned to capture an image in front of the subject 1308 in the horizontal plane of the subject's eyes with the axis between the eyes. The first camera 1310 advantageously images the patient 1308 through a beam splitter 1330 placed at substantially 45 degrees. The beam splitter 1330 allows the patient 1308 to see and focus on an object in the distance without the camera 1310 being visible. The use of the beam splitter 1330 advantageously allows the subject to look outside of the apparatus and focus on one or more real or fixation targets placed at one or more distances and/or locations within a field of view. The use of real or fixation targets at various locations and distances allows the system to capture and measure pupil locations for various eye placements. For example, a first pupil reading can be determined using a first set of images captured while the subject is focused on a target placed at a typical reading distance and a typical reading angle. A second pupil reading can be determined using a second set of images captured while the subject is focused on a distant object.

The beam splitter 1330 may alternatively be a partially silvered mirror, dichroic filter, or some other light splitting device. The system allows the subject 1308 to focus on a distant object without the image being occluded by the first camera 1310. This ensures the position of the subject's eyes is not affected by objects in a near field of view. Such near field objects may, for example, affect the accuracy of the pupilary distance determination.

A second camera 1312 can be positioned to capture an image that is substantially perpendicular to the image captured by the first camera 1310. The second camera 1312 can be configured to capture an image of the side of the patient 1308. The second camera 1312 can be positioned with the axis of the camera approximately in line with the subject's cornea.

An optional third camera (not shown) can be positioned above, facing down in line with a vertical axis coincident with a point between the patient's eyes. Each of the cameras 1310 and 1312 can be configured to simultaneously capture images of the patient 1308. Alternatively, the cameras 1310 and 1312 can be configured to sequentially capture images of the patient 1308. If the cameras, for example 1310 and 1312, are configured to sequentially capture images, the time between successive images may be controlled to minimize potential movement of the patient 1308 between images. In one embodiment using sequential image capture, the cameras may be cycled to capture images at a rate of approximately 15 frames per second.

Figure 13B:
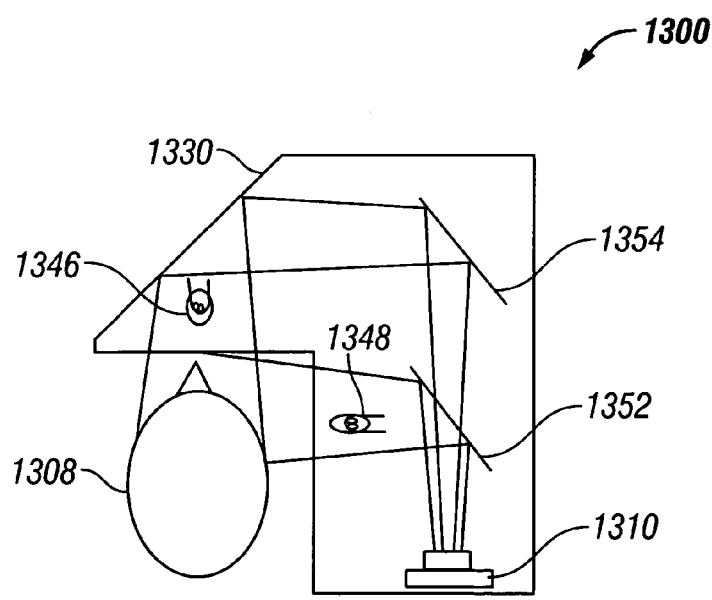

In other embodiments, a single camera can capture multiple images. For example, the position of a single camera may be moved prior to capturing each of the desired images. Alternatively, filters and reflectors and/or different wavelength illumination sources can be used to allow a single camera to simultaneously capture multiple views. For example, in the system shown in FIG. 13A, a single camera having a wide field of view may simultaneously capture both the front and side view of the patient 1308 using two wavelength dependent beam splitters and two different wavelengths for illumination. An alternative single camera embodiment is shown in FIG. 13B.

Image analysis can be performed in an image processor (not shown) to determine the position and angle of the frames in relation to the subject 1308. A calibration routine can orient the position and image scaling of the multiple cameras such that an object imaged by the camera, for example 1310, can be located and measured in three dimensions in software. The calibration routine can include, for example, placing an object, such as a calibration object or calibration fixture, in the field of view of the cameras, for example 1310 and 1312, and capturing images of the object. The image processor is then calibrated using the captured images of the calibration fixture.

The calibration object can be imaged to allow each camera used in the system to be calibrated with respect to the other camera(s). The calibration procedure can be performed with a three-dimensional spatial calibration fixture. Calibration of the cameras enables the image processor to determine spatial relations between items identified in each view.

The fixture can have, for example, a surface that is marked with a grid of known dimensions. The images captured by the cameras can then be calibrated to the dimensions of the grid. In one embodiment, the calibration fixture is a block having a surface covered in a grid of known dimensions. The block is placed with a face of the block at approximately 45 degrees relative to the axis of the first and second cameras, 1310 and 1312. In a second embodiment, the calibration object is a flat sheet having a grid of known dimensions. The sheet is placed at approximately 45 degrees relative to the axis of the first and second cameras 1310 and 1312. In still another embodiment, the calibration object is a scale having markings of known dimensions. The scale is placed at approximately 45 degrees relative to the axis of the first and second cameras 1310 and 1312.

The images of the patient 1308 captured from each camera can be analyzed by image recognition software that locates the subject's pupil and the outline of the frame 1306 in each captured image. The image processor determines the location of the frame 1306 to the eye and gives coordinates for pupil distance, SEG height from the front view, and vertex distance and pantoscopic tilt from the side. The overhead view camera (not shown) can be utilized to verify that the patient 1308 is aligned with the first and second cameras 1310 and 1312. If the image processor determines that the patient 1308 is not aligned with the cameras, the image processor can provide additional information, based in part on the overhead image, to correct the measurements for angular displacement between the camera and the optical axis of the eye.

The system can use controlled lighting to simplify the image processing function. The purpose of the controlled lighting is twofold. Indirect, even, lighting can illuminate the frames 1306 and face to improve the success of the image analysis routine. To further improve the ability of the image analysis algorithm to discriminate the pupil of the subject 1308, directional point source lights, or fiducial markers, can be added in predetermined locations. The point light sources can be configured to reflect off the cornea in a specific pattern. Using pattern recognition, the image processor or image processing software can search each captured image for the specific pattern. For example, the predetermined pattern may be two or more points outside the pupil in the front view and one light source reflection captured in the side image. The point source lighting can be of a specific color, making them easier to identify in an image via a spectral signature. Alternatively, filters, may be placed in front of one or more light sources to alter the color or spectrum of the light emitted from the light source.

In addition, the lights can be computer controlled such as by the processor 1240 of FIG. 12, allowing them to be turned on and off between frames. Cycling the lights allows one image to be taken with the lights on. One or more lights can then be turned off before the next image so as not to be included in the image used to detect the pupil. The successive images can be captured in a narrow time frame such that the movement between the images would be small or essentially zero. The two images can be overlaid or compared to orient index marks from light source reflections to the pupil.

Alternatively, even or uniform light sources may be used without point source lights. In FIG. 13A, a first light source 1342 is placed along one side of the patient's 1308 face. A second light source 1344 is placed along an opposite side of the patient's 1308 face. Each of the light sources can be, for example, an array of LED lights or an incandescent lamp. The cornea reflects the light from the light sources, 1342 and 1344. The spherical shape of the cornea produces a reflection of the light sources on the surface of the cornea that is substantially localized, even from a substantially uniform light source. Thus, each of the light sources, for example 1342 and 1344, produces a reflection on each of the patient's 1308 cornea. Each of the reflections is substantially localized as a point on the cornea.

The image processor (not shown) can search the captured images for the point of reflections on the cornea. For example, the image processor can search the images for the points that have high light intensity. Once these points on the cornea are located in the images, the image processor searches for the dark circle of the pupil within a specified area of the reflection. The image processor can use, for example, connectivity or blob analysis to distinguish the pupil. Advantageously, the image processor performs a two dimensional search of the images for the pupil. The image processor then determines the center of the pupil.

In one embodiment, the subject 1308 can be imaged first without the spectacle frame 1306, than again with the spectacle frame 1306 in place. Both sets of images can be overlaid using features or landmarks common to both images. The image processor can take the difference of the two images allowing the frames 1306 to be extracted from the images. This technique is especially useful when the spectacles 1306 have stylized features, or are of a design which prevents the fiducial marks from being imaged.

In addition to locating the pupils, the image processor also determines the left and right spectacle frame box. The spectacle frame box is used, for example, in determining the SEG height. In one embodiment, the spectacle frame determination can be performed automatically by means of filters and edge detection algorithms. Alternatively, the spectacle frame determination can be performed by allowing an operator to provide input to the system through a user interface, which allows the operator to drag or draw a box around the image of the spectacle frames until the edges of the box are approximately tangent with an edge of each of the four sides of the lens frame. For example, the system may allow an operator to view a captured image of the patient 1308 and allow the operator to use a mouse or other input device to draw a box around each of the lens frames.

FIG. 13B is a functional block diagram of an alternative frame fitter 1300 embodiment that uses a single camera 1310. The functional block diagram shows an overhead view of a patient or subject 1308 positioned in relation to a single camera frame fitter system 1300.

A camera 1310 is configured to image a patient 1308 through the use of multiple dichroic beam splitters 1352 and 1354 and a broadband beam splitter 1330 used to allow the patient 1308 to focus on an image in the distance without having the camera 1310 in the field of view. The camera 1310 is positioned with an image axis that is substantially parallel to the image axis of the patient 1308. The camera 1310 can capture a side image of the patient 1308 using a first dichroic beam splitter 1352 placed in the filed of view of the camera 1310. The first dichroic beam splitter 1352 can be, for example, placed at substantially a 45 degree angle relative to the camera image axis. The first dichroic beam splitter 1352 can also be positioned approximately along an axis extending through the side of the patient's head, substantially perpendicular to the patient's image axis.

A second dichroic beam splitter 1354 is placed at approximately 45 degrees relative to the image axis of the camera 1310 and is placed behind the first dichroic beam splitter 1352. The front image of the patient 1308 reflects off of the broadband beam splitter 1330 placed in front of the patient 1308. The front image from the broadband beam splitter 1330 reflects to the second dichroic beam splitter 1354, passes through the first dichroic beam splitter 1352 and is captured by the camera 1310.

Two light sources 1346 and 1348 are used to illuminate the patient 1308. In one embodiment, a first light source 1348 is a colored light source, where colored light refers to a spectrum of light that is narrower than a white light source. The first light source 1348 can be, for example a red light source, or a light source emitting substantially red light, that illuminates the patient 1308 with a spectrum of light that is substantially within the red spectrum. The first dichroic beam splitter 1352 can filter and reflect a light spectrum that corresponds to the spectrum of the light source 1348 and passes light that is above or below a predetermined wavelength. Thus, in the example, the first dichroic beam splitter 1352 is configured to be a red dichroic beam splitter that reflects red light and passes green light. The camera 1310 therefore only receives an image representing the wavelength of the light source in combiantion with the dichroic beam splitters, 1352 and 1354.

Similarly, the second light source 1346 can be a colored light source, such as a green light source, or a light source that emits substantially green light. The second dichroic beam splitter 1354 can be a green dichroic beam splitter that is configured to reflect only green light corresponding to the spectrum of the light source 1346. The second dichroic beam splitter 1354 is configured to pass all other wavelengths.

The light sources 1346 and 1348 need not be green and red light sources, but may be any type of colored light sources, or may be narrowband light sources that can emit radiation in a visible spectrum, non-visible spectrum, or combination of visible and non-visible spectrums.

Thus, the camera 1310 captures an image that is a composite of a 'side image reflected by the red dichroic beam splitter 1352 and a front image reflected by the green dichroic beam splitter 1354. The image processor (not shown) can be configured to process the images based in part on the spectrum of the captured image. Thus, by analyzing the red portions of the image, the image processor can isolate portions of the side image. Similarly, by analyzing the green images, the image processor (not shown) can analyze the front image. Alternatively, the front and side images may be captured sequentially and analyzed as separate images.

In additiona, the camera 1310 can capture two images in succession, the first with only the red light source 1348 illuminated, reflecting off of the red dichroic beam splitter 1352, representing the side image to the camera 1310. The second image can be generated using the green light illumination 1346, and presenting a front image reflecting off the green dichroic beam splitter 1354 to the camera 1310. The successive image capture approach can thus be used with color cameras as well as monochrome cameras.

Figure 14:
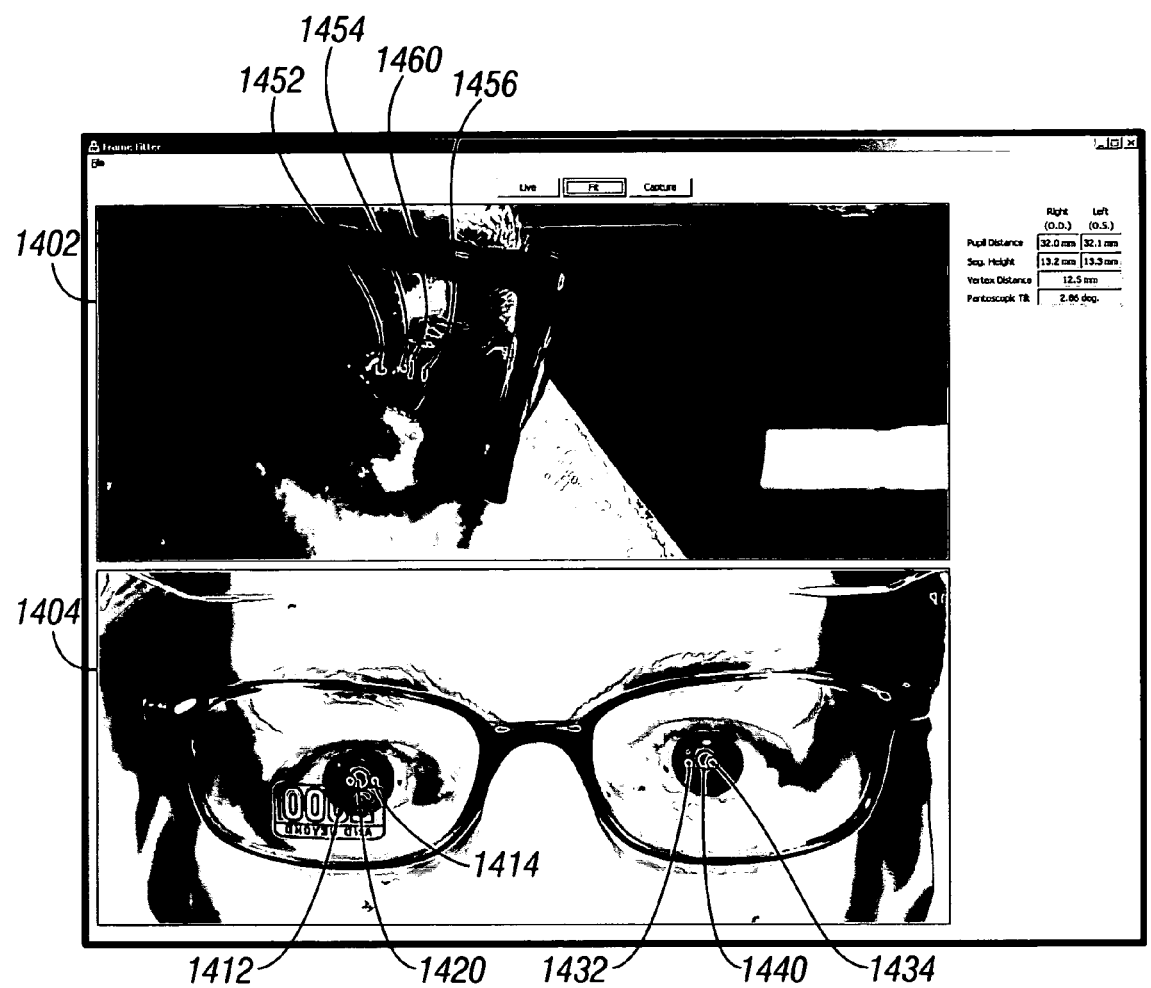
FIG. 14 is a screen shot of captured side and front images.
Figure 15:
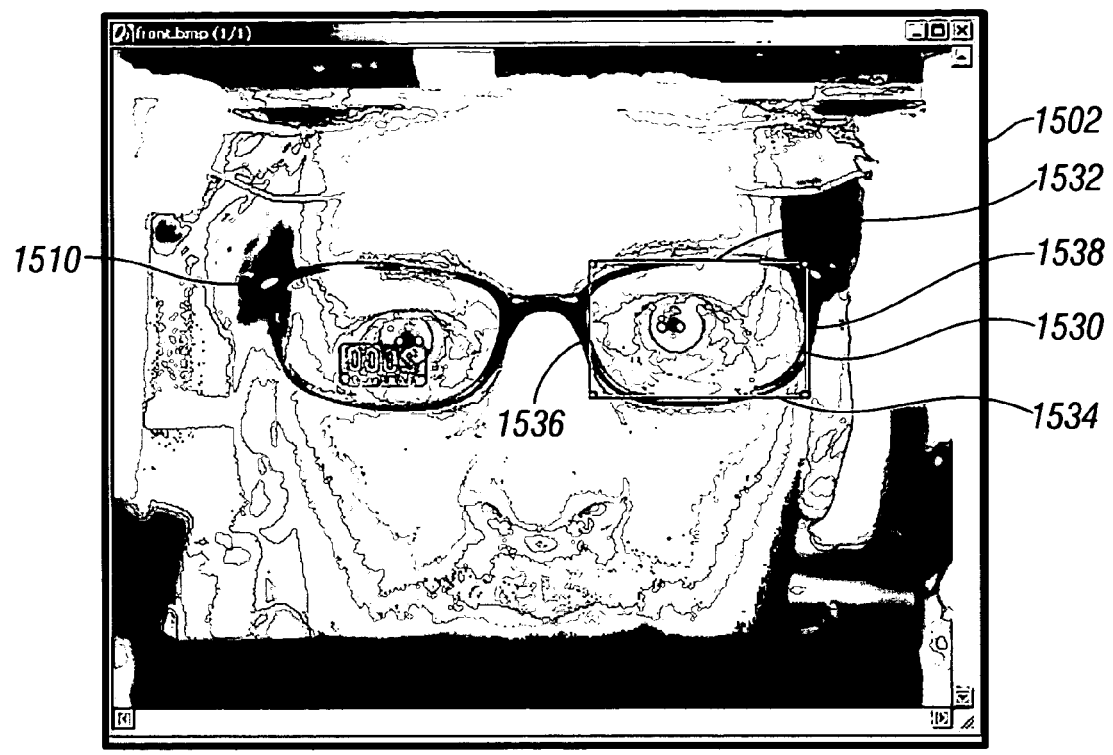
FIG. 15 is a screen shot of a captured front image with a frame locator.
Figure 16:
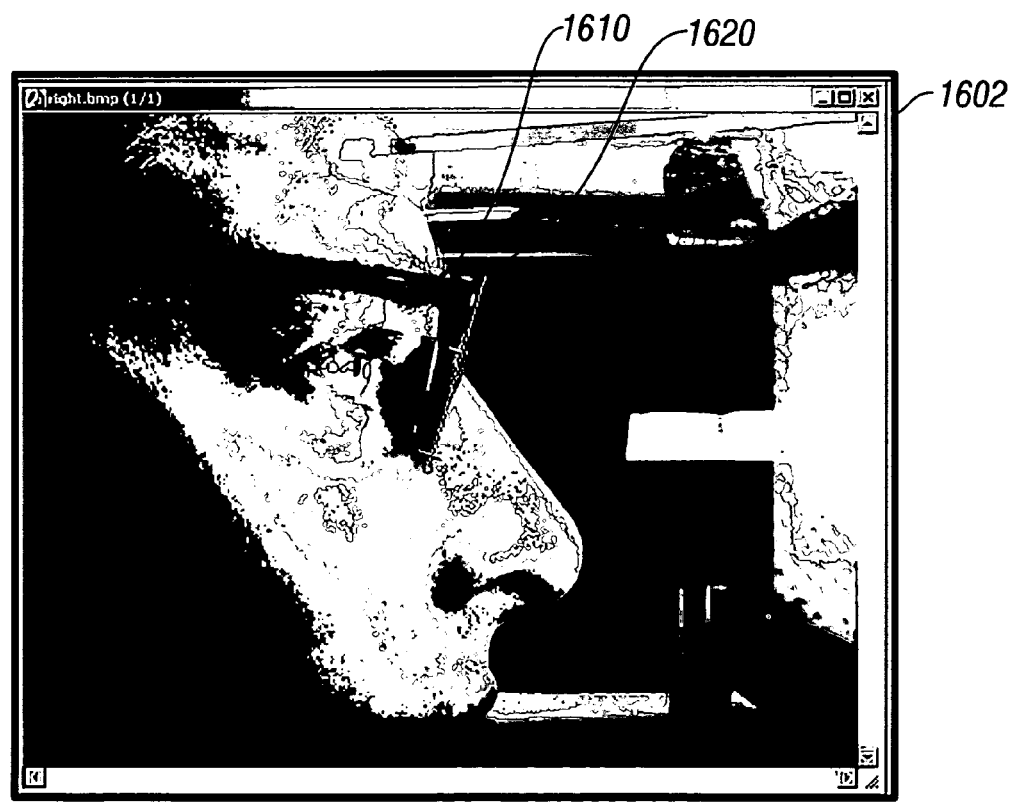
FIG. 16 is a screen shot of a captured side image with a frame locator.

FIGS. 14 through 16 show captured images and the process of analyzing the images for the desired information. Although screen shots of captured images are shown in the figures, the images need not be displayed to an operator, and the system may perform the image analysis without displaying the captured images.

FIG. 14 shows a screen shot of side 1402 and front 1404 view images of a subject captured using the frame fitting system of FIG. 13. The images include fiducial marks that were added by the image processor during determination of the pupil. Additionally, the images include highlighting to indicate the area determined to be the pupils. The fiducial marks and highlighting were added by the image processing system and are not part of the original captured images.

The front image 1404 shows fiducial marks added by the image processor and the areas identified as the pupils. The image processor determines the position of a first fiducial mark 1412 in the subject's right eye by analyzing the image for a reflection from a first light source. The image processor can, for example, search the image for peaks in intensity corresponding to reflections of the light sources off of the subject's cornea. Similarly, the image processor can determine the position of a second fiducial mark 1414 corresponding to a reflection of a second light source off of the subject's cornea. The image processor can use the fiducial marks to determine the pupil 1420 of the right eye. For example, the image processor can use the fiducial marks as indices to begin a connectivity or blob analysis in search for the dark pupil 1420 area. The right pupil 1420 is shown as a highlighted area in the subject's right eye.

Similarly, the image processor can determine the positions of fiducial marks in the subject's left eye. The image processor determines a first fiducial mark 1432 corresponding to a reflection of a first light source off of the left cornea. The image processor also determines the position of a second fiducial mark 1434 corresponding to a reflection of a second light source off of the left cornea. The two fiducial marks 4132 and 1434 are used by the image processor in determining the left pupil 1440. The left pupil 1440 is shown as a highlighted area in the subject's left eye.

The image processor performs a similar analysis on the side view 1402. The image processor determines the position of fiducial marks 1452 and 1454 that correspond to the reflections of the light sources off of the cornea. The image processor can use the fiducial marks 1452 and 1454 to determine the pupil and to determine the edge of the cornea 1456.

FIG. 15 is a screen shot of a captured front image with an outline of a frame determined by a frame locator. The frame locator can be, for example, part of the image processor of FIG. 12.

The front view image 1510 includes a view of the subject wearing desired frames 1510. The position of the frame is located as part of the determination of the position of the corrective lens within the frame. In one embodiment, the image processor determines the position of the left and right lens frames. The image processor can determine the position of the frames, for example, by using edge detection filters such as Sobel or Roberts type in conjunction with connectivity or blob analysis. The image processor can determine a high level of contrast, for example, in the portion of the image near the bridge of the subject's nose. The image processor can then use edge detection filters and connectivity or blob analysis to determine the remainder of the frame. Once the image processor determines the outline of the frame, the image processor can determine the position of a box 1530 that outlines each lens frame. The image processor determines the box 1530 having sides, 1532, 1534, 1536, and 1538, tangent to each of the lens frame sides. The image processor can use, for example, edge detection based in part on the blob analysis of the frame.

For example, the image processor can determine the position of the lens frame for the left eye corrective lens. The image processor determines the left edge 1536 of the box 1530 by determining the inside edge of the centermost portion of the lens frame. The image processor similarly can determine the top edge 1532, bottom edge 1534, and right edge 1538 of the box 1530. The image processor then repeats the process for the right eye corrective lens frame.

In an alternative embodiment, two front images of the subject are captured. A first image is captured of the subject without spectacle frames. A second image is captured of the subject wearing the desired spectacle frames. The image processor aligns the two captured images, for example using correlation analysis. The image processor can then extract the image of the spectacle frame by taking the difference of the two images. The image processor can then determine the position of the lens frames using the process described above.

In still another embodiment, the captured front image 1502 is displayed to an operator. The position of the lens frames are identified using input from an operator. The frame fitting system receives an input from the operator identifying the position of the lens frames. In one embodiment, the operator uses a computer mouse to drag a box 1530 having sides that are tangent to the lens frames. The operator repeats the entry for the right and left lens frames.

FIG. 16 is a screen shot of a side view image 1602 showing a subject wearing desired spectacle frames. In one embodiment, the image processor automatically determines the pantoscopic tilt of the frame. As before, the image processor can automatically determine the pantoscopic tilt by analyzing one or more captured images.

In one embodiment, the image processor uses edge detection filters and connectivity or blob analysis to identify the spectacle frames within the image. The image processor then determines the pantoscopic tilt of the frame by determining a line tangent to a front of the frame and measuring the angle from vertical.

In a second embodiment, two side images of the subject are captured, one without spectacle frames and one with spectacle frames. The two images are aligned and the difference of the images is determined in order to identify the spectacle frame. The image processor then uses edge detection and blob analysis to identify the outline of the frame and to determine the tangent line defining the pantoscopic tilt.

In still another embodiment, the frame fitting system displays the side image 1602 to an operator. The operator then uses an input device, such as a computer mouse, to draw or align a tangent to the frame. The line defines the pantoscopic tilt. The frame fitting system receives the data corresponding to the line to determine the pantoscopic tilt.

FIG. 17 is a flowchart of a frame fitting process 1700 that can be performed by the frame fitting system of FIG. 12. The process 1700 begins by capturing the front and side images of a subject wearing desired spectacle frames. In the system of FIGS. 12 and 13, one or more cameras can be controlled by a processor or controller to capture the front and side images of the subject. The processor can also control one or more light sources in an illuminator during the image capture.

Once the front and side images are captured, the process 1700 proceeds to block 1710 where the frame, and particularly the position of the right and left lens frames, is located. In the system of FIG. 12, the frame locator is integrated in the image processor. The frame locator determines the right and left lens frames and also determines the pantoscopic tilt of the frame.

Once the image processor locates the frame, the image processor proceeds to block 1720 to locate the pupils in the images. The image processor next proceeds to block 1730 where the frame fitting information, such as pupilary distance and SEG height are determined. The information can be reported or otherwise displayed to an operator.

In one embodiment, the image capture, image processing, and parameter determination are performed local to the subject, such as in a stand alone unit. In another embodiment, the image capture is performed local to the subject and the image processing, parameter determination, and reporting are performed remote from the subject. In the remote embodiment, the image capture can be performed in an optometrists office and the image processing performed at a remote site where the lenses are produced and assembled in the eyeglasses.

FIG. 18 is a detailed flowchart of the pupil location process 1720 performed by the image processor. The process 1720 begins at block 1802 where the image processor compares the captured image against one or more predetermined thresholds. In a color image system, the image processor compares the red, green, and blue pixels against one or more predetermined thresholds to determine the presence of bright pixels. Those pixels that exceed the threshold are determined to be bright pixels.

The image processor then proceeds to block 1810 where connectivity or blob analysis is performed on the captured image to determine the bright spots. The image processor can perform connectivity analysis on each of the pixels that exceeds the predetermined thresholds. The image processor produces one or more blobs based on the connectivity analysis.

The image processor next proceeds to block 1820 where the identified blobs are filtered based on size and shape characteristics. Because the position of the one or more light sources is known, the approximate shape and location of the corneal reflections is known. Those shapes and positions of blobs which do not fall within the filter criteria are rejected as not corresponding to light reflections from the subject's cornea.

The image processor next proceeds to block 1830 where the image processor performs a threshold for dark pixels. Again, where the captured image is in color, the image processor compares the captured red, green, and blue pixels against one or more predetermined dark thresholds.

The image processor next proceeds to block 1840 where connectivity or blob analysis is performed on the identified dark pixels. Each of the dark pixels can define a dark blob. One or more of the dark pixels may belong to the same dark blob.

After defining the dark blobs, the image processor proceeds to block 1850 to filter the dark blobs with respect to, for example, size and shape characteristics. The image processor identifies the pupils as approximately dark circles that occur within predefined regions of the image. Those dark blobs that do not correspond to such criteria can be filtered out.

The image processor proceeds to block 1860 to determine the location of the pupils based on the bright blob analysis and the dark blob analysis. The bright spots correspond to reflection of the light sources. Similarly, the dark spots may correspond to the pupils. The spherical shape of the cornea and the placement of the light sources relative to the subject result in the bright light reflections being positioned near the pupil regions. The image processor can use the bright light reflections as fiducial marks used to help identify the pupils. Thus, the image processor can use the two dimensional shape analysis along with fiducial marks to determine the position of the pupils. Once the pupils have been identified, the process 1720 is finished and ends 1890.

The flowcharts of FIGS. 17 and 18 show the operation of steps in a particular order. However, one may appreciate that the order of such steps is not necessarily limited to the order shown in the flowcharts. For example, the frame location step 1710 and the pupil location step 1720 do not need to be performed in the order shown, but may be performed in the opposite order. Additionally, the bright and dark blob analysis can be performed in an order other than what is shown in FIG. 18. Other modifications, including reordering, additions, and omissions may be made to the flowcharts of FIGS. 17 and 18.

Thus, a frame fitting system and method for fitting spectacle frames is disclosed. The system captures at least one front and side image of a subject wearing desired spectacle frames. The system uses an image processor using a two dimensional image processing algorithm to identify the position of the subject's pupils. Additionally, the image processor uses two dimensional image processing techniques to identify lens frames and a pantoscopic tilt of the frame. The system can determine the pupilary distance and SEG height of lenses within a particular spectacle frame to ensure proper fitting of the lenses within the frames.

While the frame fitting system and method as herein shown and disclosed in detail is fully capable of functioning as herein before stated, it is to be understood that the description is merely illustrative of embodiments of the invention and that no limitations are intended to the details of construction or design herein shown other than as described in the appended claims.

What is claimed is:

1. A spectacle frame fitting system, the system comprising:
an imager configured to capture a front image and a side image of a subject field;
an image processor configured to receive and analyze the front image and the side image to determine a pupil position relative to a spectacle frame captured in the front and side images; and
an illuminator configured to illuminate the subject when the imager captures the front image and the side image,
wherein the illuminator comprises a plurality of light sources configured to generate a predetermined pattern on a cornea of a subject positioned within the subject field.

2. The system of claim 1, wherein the image processor determines the pupil position based in part on the predetermined pattern.

3. A spectacle frame fitting system, the system comprising:
an imager configured to capture a front image and a side image of a subject field;
an image processor configured to receive and analyze the front image and the side image to determine a pupil position relative to a spectacle frame captured in the front and side images; and
an illuminator configured to illuminate the subject when the imager captures the front image and the side image;
wherein the illuminator comprises at least one colored light source to determinate said pupil position.

4. A spectacle frame fitting system, the system comprising:
an imager configured to capture a front image and a side image of a subject field;
a plurality of light sources configured to generate a predetermined pattern on a cornea within the subject field; and
an image processor configured to analyze the front image and the side image to determine a pupil position relative to a spectacle frame captured in the front and side images, based in part on the predetermined pattern.

5. The system of claim 4, wherein the imager is configured to capture an additional front image during a period in which at least one of the plurality of light sources is not illuminated.

6. A method of fitting a corrective lens to a spectacle frame, the method comprising:

capturing a front image of a subject wearing the spectacle frame;
capturing a side image of the subject wearing the spectacle frame;
determining a position of a lens frame from the captured images;
determining the position of at least one pupil of the subject from the captured images; and
determining a pupillary center of the corrective lens based in part on the position of the lens frame and the position of the pupil,
wherein capturing the front image of the subject comprises:
illuminating the subject with a plurality of lights to generate a pattern on at least one cornea of the subject; and
capturing the front image during the period in which the plurality of lights is illuminated.

7. A method of fitting a corrective lens to a spectacle frame, the method comprising:
capturing a front image of a subject wearing the spectacle frame;
capturing a side image of the subject wearing the spectacle frame;
determining a position of a lens frame from the captured images;
determining the position of at least one pupil of the subject from the captured images; and
determining a pupillary center of the corrective lens based in part on the position of the lens frame and the position of the pupil,
wherein determining the position of at least one pupil comprises:
identifying at least one bright pixel on an image of a cornea of the subject;
identifying at least one dark pixel on the image of the cornea; and
identifying the pupil based in part on the relationship of the at least one dark pixel relative to the at least one light pixel.

8. A method of fitting a corrective lens to a spectacle frame, the method comprising:
capturing a front image of a subject wearing the spectacle frame;
capturing a side image of the subject wearing the spectacle frame;
determining a position of a lens frame from the captured images;
determining the position of at least one pupil of the subject from the captured images; and
determining a pupillary center of the corrective lens based in part on the position of the lens frame and the position of the pupil,
wherein determining the position of at least one pupil comprises:
comparing the captured front image to a predetermined bright threshold to identify bright pixels;
performing connectivity analysis on the bright pixels to generate bright blobs;
filtering the bright blobs based in part on a size of the bright blob;
comparing the captured front image to a predetermined dark threshold;
performing connectivity analysis on the dark pixels to generate at least one dark blob;
filtering the at least one dark blob based on a size of the blob;
determining the position of the pupil based in part on a position of the filtered dark blobs and a position of the bright blobs.

9. A spectacle frame fitting system, the system comprising:
an imager configured to capture a front image and a side image of a subject field;
a plurality of colored light sources configured to illuminate at least a portion of the subject field; and
an image processor configured to analyze the front image and the side image to determine a pupil position relative to a spectacle frame captured in the front and side images, based in part on the predetermined pattern.

10. The system of claim 9, wherein at least one of the colored light sources is configured to generate a fiducial mark within the subject filed and the image processor analyzes the front image in part based on the fiducial mark.

11. The system of claim 9, further comprising:
a first dichroic beam splitter configured to reflect the side image of the subject field to the imager; and
a second dichroic beam splitter configured to reflect the front image of the subject filed to the imager.

12. The system of claim 11, wherein the first dichroic beam splitter passes a wavelength of light that is different than the wavelength of light passed by the second dichroic beam splitter.

13. The system of claim 11, wherein the plurality of colored light sources comprises a first colored light source and a second colored light source, the first dichroic beam splitter configured to reflect wavelengths corresponding to the first colored light source and the second dichroic beam splitter configured to reflect wavelengths corresponding to the second colored light source.

14. The system of claim 13, wherein the camera captures successive images and each image corresponds to illumination with one of the plurality of colored light sources.

* * * * *